(12) United States Patent
Hodgson et al.

(10) Patent No.: US 9,334,780 B2
(45) Date of Patent: May 10, 2016

(54) INJECTION DEVICE FOR INJECTING A FLUID AND MOTOR VEHICLE HAVING AN INJECTION DEVICE

(71) Applicant: EMITEC GESELLSCHAFT FUER EMISSIONSTECHNOLOGIE MBH, Lohmar (DE)

(72) Inventors: Jan Hodgson, Troisdorf (DE); Sven Schepers, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/084,694

(22) Filed: Nov. 20, 2013

(65) Prior Publication Data

US 2014/0075923 A1    Mar. 20, 2014

Related U.S. Application Data

(63) Continuation of application No. PCT/EP2012/059256, filed on May 18, 2012.

(30) Foreign Application Priority Data

May 20, 2011    (DE) .......... 10 2011 102 170

(51) Int. Cl.
*F01N 3/00*    (2006.01)
*F02M 61/14*    (2006.01)
(Continued)

(52) U.S. Cl.
CPC ............. *F01N 3/24* (2013.01); *F01N 3/2066* (2013.01); *F01N 2610/02* (2013.01);
(Continued)

(58) Field of Classification Search
CPC ..... F01N 3/24; F01N 3/2066; F01N 2610/02; F01N 2610/1446; F01N 2610/1453; F01N 2610/1466; F01N 2610/1486; F02M 61/14; Y02T 10/24
USPC .................................................. 60/295, 303
See application file for complete search history.

(56) References Cited

U.S. PATENT DOCUMENTS 6,179,220 B1    1/2001    Kolkman et al.
6,318,341 B1    11/2001   Gmelin et al.
(Continued)

FOREIGN PATENT DOCUMENTS

DE    19847839 A1    4/2000
DE    19853090 A1    5/2000
(Continued)

OTHER PUBLICATIONS

International Search Report of PCT/EP2012/059256, Dated Sep. 6, 2012.

*Primary Examiner* — Audrey K Bradley
(74) *Attorney, Agent, or Firm* — Laurence A. Greenberg; Werner H. Stemer; Ralph E. Locher

(57) ABSTRACT

An injection device for injecting a fluid into an exhaust-gas treatment device includes an injector positioned in an injector holder. The injector has a supply opening and a component of the injector holder extends into the supply opening. The injection device is suitable, in particular, for supplying a urea/water solution into an exhaust-gas treatment device of a motor vehicle. The component is preferably rigid in the longitudinal direction and can be compressed in the radial direction by way of a deformable rubber shell, in order to compensate for the volumetric expansion of the solution if it freezes. A motor vehicle having the injection device is also provided.

6 Claims, 3 Drawing Sheets

(51) Int. Cl.
*F01N 3/24* (2006.01)
*F01N 3/20* (2006.01)

(52) U.S. Cl.
CPC .... *F01N 2610/11* (2013.01); *F01N 2610/1446* (2013.01); *F01N 2610/1453* (2013.01); *F01N 2610/1466* (2013.01); *F01N 2610/1486* (2013.01); *F02M 61/14* (2013.01); *Y02T 10/24* (2013.01)

(56) References Cited

U.S. PATENT DOCUMENTS

| | | | |
|---|---|---|---|
| 7,219,698 | B2 | 5/2007 | Mayer |
| 7,278,625 | B2 | 10/2007 | Huber et al. |
| 2003/0000581 | A1 | 1/2003 | Lehtonen |
| 2004/0262333 | A1 | 12/2004 | Huber et al. |
| 2008/0236147 | A1* | 10/2008 | Van Vuuren et al. ............ 60/295 |
| 2010/0320285 | A1 | 12/2010 | Haeberer et al. |

FOREIGN PATENT DOCUMENTS

| | | |
|---|---|---|
| DE | 102004001505 A1 | 8/2005 |
| DE | 102008001948 A1 | 1/2009 |
| EP | 2221459 A1 | 8/2010 |
| FR | 2942500 A1 | 8/2010 |
| JP | 2004506143 A2 | 2/2004 |
| JP | 2004514821 A | 5/2004 |
| JP | 2008291678 A | 12/2008 |
| JP | 2010514975 A | 5/2010 |
| WO | 0213951 A1 | 2/2002 |
| WO | 0204616 A1 | 5/2002 |
| WO | 2008151908 A1 | 12/2008 |
| WO | WO 2008151908 A1 * 12/2008 ................ F01N 3/20 |
| WO | 2012049175 A1 | 4/2012 |

* cited by examiner

INJECTION DEVICE FOR INJECTING A FLUID AND MOTOR VEHICLE HAVING AN INJECTION DEVICE

CROSS-REFERENCE TO RELATED APPLICATION

This is a continuation, under 35 U.S.C. §120, of copending International Application No. PCT/EP2012/059256, filed May 18, 2012, which designated the United States; this application also claims the priority, under 35 U.S.C. §119, of German Patent Application DE 10 2011 102 170.5, filed May 20, 2011; the prior applications are herewith incorporated by reference in their entirety.

BACKGROUND OF THE INVENTION

Field of the Invention

The invention relates to an injection device provided for injecting a fluid into an exhaust-gas treatment device and having an injector positioned in an injector holder. The invention also relates to a motor vehicle having an injection device.

It is known for a fluid to be supplied in a targeted manner to an exhaust-gas treatment device for the purpose of purifying exhaust gases of an internal combustion engine, for example in order to realize a chemical conversion of exhaust-gas constituents. A fluid of that type is, for example, an oxidant or a reducing agent. A urea-water solution is used, in particular, as the fluid. A 32.5% urea-water solution which is particularly commonly used for the reduction of harmful nitrogen oxide compounds in exhaust gas is available, for example, under the trademark AdBlue®. The method of selective catalytic reduction [SCR] can be performed in the exhaust-gas treatment device with a urea-water solution of that type. The dosing of the fluid may take place by using an injection device having an injector. An injector can be opened and closed again in a targeted manner in order to provide the fluid in a dosed fashion.

In the case of such injection devices, it must generally be taken into consideration that the supplied fluid can form deposits. Such deposits are common in injection devices, in particular in the field of the injectors. In that field, the flow path for the fluid to be supplied to the injector often has structurally induced diversions and widenings which lead to slowing and/or swirling of the fluid to be supplied. That promotes the formation of deposits. Furthermore, very large temperature fluctuations are generally encountered at injection devices. That also intensifies the formation of deposits. In particular, if a urea-water solution is used as a fluid, elevated temperatures (in the vicinity of the exhaust system) can cause a chemical change of the urea-water solution to already occur in the injection device, which accelerates the formation of deposits. It must likewise be taken into consideration that the fluid can also freeze at low temperatures, and then cause damage and/or block the injector due to the expansion in volume.

SUMMARY OF THE INVENTION

It is accordingly an object of the invention to provide an injection device for injecting a fluid and a motor vehicle having an injection device, which overcome the hereinaforementioned disadvantages and at least partially solve the highlighted problems of the heretofore-known devices and vehicles of this general type. In particular, it is sought to disclose an injection device which has a technically simple construction and in which the functionality of the injector in the event of temperature fluctuations is improved.

With the foregoing and other objects in view there is provided, in accordance with the invention, an injection device for injecting a fluid into an exhaust-gas treatment device, comprising an injector positioned in an injector holder. The injector has a supply opening and a component extends into the supply opening.

In accordance with another particularly advantageous feature of the injection device of the invention, the component is (substantially) rigid in a longitudinal direction oriented parallel to the supply opening and is at least partially compressible in a radial direction with respect to the longitudinal direction.

The injection device is suitable, in particular, for injecting a fluid into an exhaust-gas treatment device. The fluid is, in particular, a reducing agent or a urea-water solution. Thus, what is proposed herein is, in particular, an injection device for injecting a urea-water solution into an exhaust line of an exhaust-gas treatment device of a motor vehicle.

Through the use of the component which extends into the supply opening of the injector, it is firstly possible for the flow of the fluid into the injector to be accelerated. Furthermore, the flow path or the flow into the injector can be homogenized. Through the use of the component, it is also possible for regions that would (otherwise) be traversed less (effectively) by flow to be subjected to a better flow or better purging, in such a way that deposits are more effectively avoided in those areas. Furthermore, connector-induced or injector-induced large volumes in the region of the supply opening of the injector can be reduced, in such a way that even in the event of temperature fluctuations (boiling and/or freezing), vapor bubbles, deposits and/or high ice pressures can be reduced or even eliminated.

Through the use of the proposed injection device, an expansion of the fluid can be compensated in a particularly effective manner. The fluid (for example urea-water solution) expands, for example, when it freezes. That is a problem, in particular, in the region of the injector of the injection device, because the injector can be damaged as a result of the increase in volume of the fluid.

The line system of an injection device (that is to say, in particular, the fluid-filled volume of the injection device) should preferably be as rigid as possible in order to attain the greatest possible dosing accuracy of the injection device. This is because, the more rigid the line system, the less effect pressure fluctuations during operation have on the volume of the line system. A high degree of flexibility of the line system is advantageous for particularly good compensation of the expansion of the fluid when it freezes. The higher the degree of flexibility, the lower are the pressures that arise during the expansion during the formation of ice, and the lower is the risk of damage to the injection device (and, in particular, to the injector) during the freezing process.

It has been found that, by using the described component, it is possible to achieve particularly effective compensation of the expansion of the fluid as it freezes in the region of the injection device, with particularly low compressibility of the line system (or of the fluid-filled volume). An expansion of the reducing agent is particularly critical in this case because that expansion could be channeled away in the direction of the supply opening (in longitudinal direction) into a feed duct to the injection device. It is therefore advantageous for there to be provided in the supply opening a component which exhibits its compressibility in a radial direction perpendicular to the longitudinal direction of the supply opening, specifically for the compensation of the expansion.

The (substantially only radial) compressibility can be achieved, for example, by a displacement and/or deformation of the component laterally with respect to the supply duct. For this purpose, it would be possible, if appropriate, to utilize spaces provided in the component, which spaces provide a (reversible) substitute space for the ice during a freezing process. In particular, it is possible in the event of an arising ice pressure for parts of the component and/or the component itself to be deformed and/or compressed.

The injection device is furthermore advantageous if the component is formed by at least one insert which is disposed together with the injector in the injector holder.

An insert of that type may be provided in the injector holder for the purpose of holding the injector in its position. The insert preferably forms a component of a feed duct to the injector. The feed duct is generally connected through further line sections to a delivery unit for the fluid and to a tank for the fluid.

The injection device is also advantageous if the insert has a feed duct which leads to the component and to the supply opening and which extends through the injector holder.

The component which extends into the supply opening of the injector is preferably configured in such a way that, in the region of the supply opening of the injector, a cross section through which reducing agent can flow is present which corresponds substantially to the cross section of the feed duct.

The injection device is furthermore advantageous if the component includes a pipe. The pipe may, for example, form a continuation of a feed duct to the injector. A pipe of this type generates a particularly effective homogenization of the flow path into the injector. The pipe preferably has an internal cross section which corresponds approximately to an inner duct of the injector adjoining the supply opening.

The injection device is furthermore advantageous if the component has at least one perforation. In this embodiment, the component is preferably in the form of a pipe which has a pipe wall. The perforation (in other words, a multiplicity of passage openings, holes, etc.) is provided in that pipe wall. The pipe preferably has a uniform perforation which is distributed uniformly over the entire component and which is composed of a multiplicity of openings. Through the use of the perforation, the surface area and the volume of the pipe wall is preferably reduced by at least 20%, wherein the surface area and the volume should particularly preferably be reduced by no more than 50%.

It is also proposed that the component be surrounded by at least one rubber sheathing. The rubber sheathing further prevents the formation of deposits. The surface of the rubber sheathing alone prevents a permanent adhesion of deposits. Furthermore, the rubber sheathing is elastic and changes its volume and its shape when the pressure of the fluid in the feed duct fluctuates. The rubber sheathing may, for example, be vulcanized onto the component. The rubber sheathing is preferably manufactured from a compressible material. Through the use of a rubber sheathing, it is achieved that the component is at least partially compressible in the radial direction. The rubber sheathing may, in particular, also be understood as a constituent part of the component. The component then preferably has a multipart form and has a (preferably rigid) core and the surrounding, flexible rubber sheathing.

The component may furthermore have a roughened surface in the region of the rubber sheathing. A surface of that type provides particularly good support for a vulcanized-on rubber sheathing. The roughened surface preferably has an (averaged) roughness depth RZ of between 5 μm [micrometers] and 15 μm [micrometers].

In a further variant, the rubber sheathing may also be shrink-fitted onto the component. The rubber sheathing may, for example, be mounted in the manner of a shrink-fit hose onto the component. After the rubber sheathing in the form of a shrink-fit hose has been mounted onto the component, the shrink-fit hose is activated and shrunk on by using a particular change in the ambient conditions. A change in the ambient conditions may, for example, be a brief increase in the ambient temperature. As a result of the shrink-fitting, the shrink-fit hose or the rubber sheathing then comes to lie tightly against the component. The surface of the component and of the shrink-fit hose are preferably constructed in such a way that there is a high coefficient of friction between the component and the rubber sheathing. The coefficient of friction is preferably greater than 0.6 and particularly preferably even greater than 0.8. The coefficient of friction defines the ratio between the shear stress that can be transmitted between the rubber sheathing and the component and the normal stress that acts between the rubber sheathing and the component. The normal stress in the present case is determined substantially by the force exerted by the shrink-fit hose as it is shrunk onto the component. The greater the coefficient of friction, the more firmly the rubber sheathing is seated on the component, and the lower is the risk of the rubber sheathing sliding on the component.

Since a rubber sheathing of that type may, for example, be formed separately on an inner side and on an outer side of the pipe, it is also possible for multiple (different) rubber sheathings to be provided for one component.

For example, the rubber sheathing on the outer side of a component in the form of a pipe may be structured in such a way that the formation of deposits of reducing agents is prevented in an effective manner. For this purpose, the rubber sheathing may, for example, be hydrophobic on the outer side, so that urea-water solution rolls off in droplet form from the rubber sheathing there.

A flow of reducing agent generally passes through the inner side of a component in the form of a pipe, so that deposits are not as great a problem there as on the outer side, where there are often regions which are not traversed regularly by a flow of fresh reducing agent. The rubber sheathing may thus preferably be configured in this case in such a way that the friction of the flowing reducing agent on the rubber sheathing is particularly low, and the component thus exhibits a particularly low flow resistance. For this purpose, the rubber sheathing preferably exhibits a particularly low level of roughness on the inner side of the component in the form of a pipe. For example, the surface of the rubber sheathing on the inner side has an averaged roughness depth RZ of less than 2 μm [micrometers], preferably less than 1 μm [micrometer].

The component is preferably manufactured from a material which is substantially rigid in relation to the rubber sheathing. It is thus ensured that the basic shape of the component—for example the shape of a pipe with a pipe wall—does not deform when the pressure of the fluid in the feed duct fluctuates.

The rubber sheathing may seal off the component in the supply opening of the injector. The rubber sheathing may be formed in such a way that the component can be inserted with a form-locking connection into the supply opening and the connection between the component and the supply opening is sealed off. The rubber sheathing may be compressed (slightly) in the region of contact between the component and the supply opening, in such a way that the rubber sheathing bears with preload against the wall of the supply opening. A form-locking connection is one which connects two elements together due to the shape of the elements themselves, as opposed to a force-locking connection, which locks the elements together by force external to the elements.

In a further preferred embodiment, the component has a rubber sheathing and a perforation, and the rubber sheathing at least partially covers the perforation. The (at least one) rubber sheathing can then deform into the perforation when the pressure of the fluid in the feed duct is greatly increased. This may arise, for example, if the fluid in the feed duct freezes. Such an embodiment can be achieved in a particularly advantageous and inexpensive manner with a rubber sheathing which is applied as a shrink-fit hose to the component. A rubber sheathing of that type can, without problems, extend across the perforation without the perforation being completely covered by the rubber sheathing.

As a result of the combination of a rubber sheathing and a perforation of the component, it is additionally possible to realize a particularly effective freezing protection device for the injection device. If the fluid in the injection device freezes, the rubber sheathing can deform into the perforation and thus compensate for the volume expansion of the fluid as it freezes.

A combination of rubber sheathing and perforation is preferably provided in such a way that the rubber sheathing deforms to a significant extent into the perforation only at a pressure that lies above the normal operating pressure. This may be achieved inter alia through a suitable selection of the following parameters:
  size of the individual openings of the perforation;
  thickness of the rubber sheathing;
  modulus of elasticity of the rubber sheathing; and
  tension of the rubber sheathing over the openings of the perforation.

The rubber sheathing is preferably formed in such a way that a deformation of the rubber sheathing at a pressure below a threshold pressure results in a maximum volume enlargement of at most 100 µl [microliters], preferably at most 50 µl [microliters] and particularly preferably at most 10 µl [microliters]. The threshold pressure lies, for example, in a range between 3 and 10 bar. At pressures above the threshold pressure, it is preferable for a volume enlargement of more than 50 µl/bar [microliters/bar], preferably more than 100 µl/bar [microliters/bar], to take place as a function of the further increase in pressure. It can thus be ensured that the volume filled with reducing agent is approximately constant during normal operation, whereas a significant volume enlargement is possible when the reducing agent freezes.

In one embodiment of the injection device, the component is formed from a flexible material. The component may, in particular, be a pipe composed of a flexible material. The component may, for example, be composed at least partially or even entirely of a material with pores, the pores of which are closed and filled with a compressible gas (for example air). The fluid preferably cannot penetrate into the pores. When the pressure in the injection device rises, the gas in the pores can be compressed. The component can thus be compressed, and is accordingly compressible. It is optionally possible for at least one stiffening structure to also be provided in the component (or the pipe). The stiffening structure can prevent the component from being compressible in the longitudinal direction. The stiffening structure preferably has no influence on the compressibility of the component in the radial direction.

It is preferable for the component to be constructed to be stiffer in the longitudinal direction than in the radial direction at least in a section laterally with respect to the feed duct, in particular close to or adjacent the injector. In particular, an ice pressure oriented in the longitudinal direction in the injector or in the feed duct causes a displacement of the component as a whole. By contrast, an ice pressure oriented in the radial direction in the injector or in the feed duct causes a deformation/compression (which is locally limited and disposed close to the supply opening) of the component.

It is also considered to be advantageous for the component to be constructed to supply the fluid at an accelerated rate to the injector. The component may also form a constriction of the feed duct. An acceleration of the flow in the region of the injector is thereby achieved. The prevention of deposits can be further improved in this way.

It is also proposed that the supply opening has a first cross-sectional area, and at least 40% of the first cross-sectional area is filled by the component. It is preferable for at least 50% and particularly preferably at least 70% of the cross-sectional area to be filled. In order to ensure a flow into the injector, the component self-evidently cannot fill the entire cross-sectional area, and therefore a fill ratio of at most 85% preferably should not be exceeded. The fluid-filled volume in the region of the injector is thus reduced in an effective manner. The formation of deposits can be prevented in this way because effective purging with fluid and an acceleration of the fluid flow can be attained.

It is considered to be advantageous for there to be provided on the injection device an ice pressure compensation element which is constructed to accommodate an expansion of the fluid in the longitudinal direction. The ice pressure compensation element is preferably disposed opposite the supply opening in the longitudinal direction. The ice pressure compensation element is, for example, in the form of an elastic bellows and/or flexible abutment which can deform and/or be displaced when an ice pressure arises in the injection device (as a result of the fluid freezing). An expansion of the fluid can be channeled away out of the supply opening of the injector in the longitudinal direction and, in one particularly advantageous embodiment, channeled away to an ice pressure compensation element disposed outside the injector. The ice pressure compensation element is preferably constructed in such a way that it exhibits substantially rigid characteristics during the operation of the injection device (at normal operating pressures) and, in the case of higher pressures, opens up an additional volume and accommodates an expansion of the fluid. The number and position of ice pressure compensation elements in an injection device may, for example, be adapted to the ice formation processes in the interior of the injection device.

The injection device according to the invention is furthermore advantageous if the injector is braced in the injector holder by a spring. The injector can be fixedly positioned in the injector holder by using a spring of that type, and at the same time a seal for sealing off the feed duct and the injector can be placed under preload by using the spring, in such a way that reliable sealing is ensured. It is particularly advantageous for the injector to be braced together with an insert in the injector holder, wherein the insert forms a feed duct.

With an injector braced in the injector holder, it is possible in a particularly advantageous manner for an ice pressure compensation element to be provided on the injection device. The component is preferably positioned between the spring and the injector. The component is then displaceable relative to the injector counter to a preload force exerted by the spring. An expansion in the longitudinal direction can be compensated by a displacement of the component. The preload force exerted by the spring is preferably set in such a way that the component is not displaced during operation of the injection device (at normal operating pressures).

With the objects of the invention in view, there is concomitantly provided a motor vehicle, comprising an internal combustion engine, an exhaust-gas treatment device for purification of exhaust gases of the internal combustion engine, and an injection device according to the invention for supplying a fluid to the exhaust-gas treatment device.

Other features which are considered as characteristic for the invention are set forth in the appended claims, noting that the features specified individually in the claims may be combined with one another in any desired technologically expedient manner and form further embodiments of the invention. The description, in particular in conjunction with the figures, presents the invention in greater detail and specifies additional exemplary embodiments.

Although the invention is illustrated and described herein as embodied in an injection device for injecting a fluid and a motor vehicle having an injection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
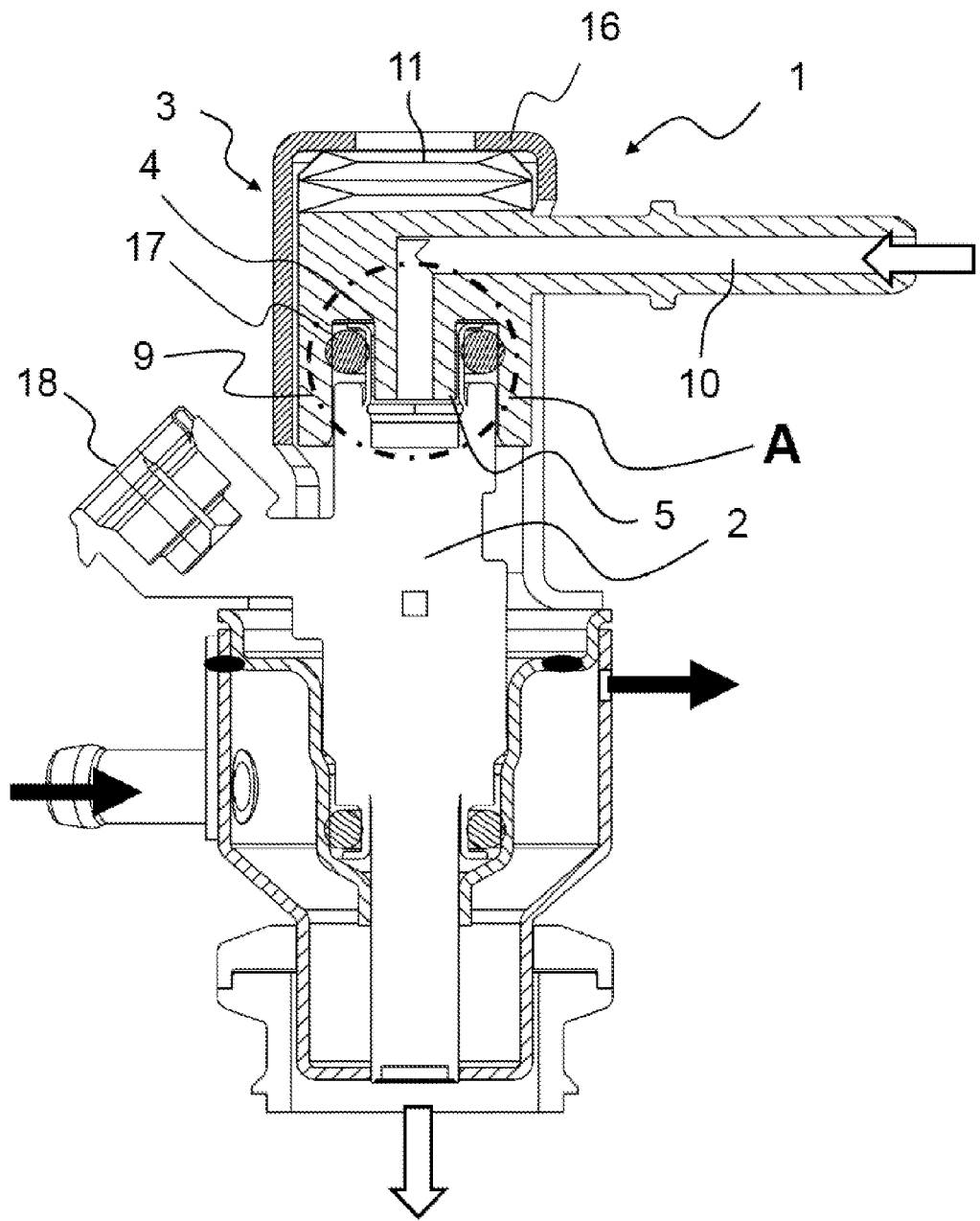
FIG. 1 is a diagrammatic, longitudinal-sectional view of an injection device.

Referring now in detail to the figures of the drawing, which show particularly preferred structural variants to which the invention is not restricted and in which the figures and, in particular, the illustrated proportions are merely diagrammatic, and first, particularly, to FIG. 1 thereof, there is seen an injection device 1 according to the invention which has an injector 2 disposed in an injector holder 3. The injector 2 has an electrical terminal 18 at which control signals for opening and closing of the injector 2 can be introduced. The injector 2 has a supply opening 4 into which a component 5 of an insert 9 extends. The insert 9 is braced together with the injector 2 in the injector holder 3 by a spring 11. The spring 11 is preferably a plate spring. An upper region of the injector holder 3 is formed by a cap 16. The insert 9 forms a feed duct 10 through which the fluid can pass into the injector 2 or into the supply opening 4 of the injector 2.

The injector 2 and the insert 9 are sealed off with respect to the surroundings by an O-ring seal 17.

Figure 2:
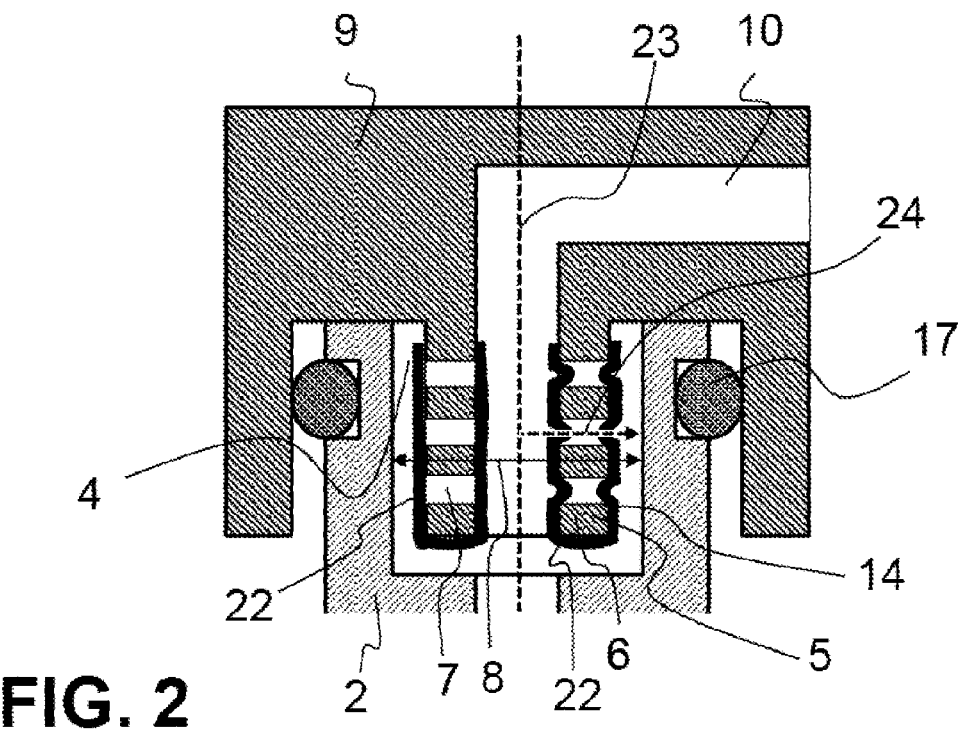
FIG. 2 is an enlarged, sectional view of a portion A of the injection device of FIG. 1.

FIG. 2 shows a longitudinal direction 23 oriented parallel to the supply opening 4 and a radial direction 24 oriented perpendicularly to the longitudinal direction, for illustrative purposes.

FIG. 2 illustrates a portion A indicated in FIG. 1 in greater detail. The figure shows the insert 9 and a section of the injector 2, in which the supply opening 4 is disposed. The component 5 of the insert 9 extends into the supply opening 4. The insert 9 forms the feed duct 10 which serves for the supply of the fluid into the supply opening 4. In this case, the component 5 is in the form of a (narrow) pipe 6. A pipe wall 14 of the pipe 6 has a perforation 7. The perforation 7 is preferably formed by a multiplicity of openings or recesses in the component 5 or in the pipe wall 14.

The component 5 or the pipe wall 14 is surrounded by a vulcanized-on rubber sheathing 22. The rubber sheathing 22 preferably extends across the perforation 7. In that region of the component 5 which is on the right in the illustration, it can be seen how the rubber sheathing 22 deforms into the perforation 7 when the pressure in the feed duct 10 is elevated.

The supply opening 4 of the injector 2 has a first cross-sectional area 8. The first cross-sectional area 8 is at least partially filled by the pipe 6 or by the cross-sectional area of the pipe wall 14 of the pipe 6. The insert 9 and the injector 2 are sealed off with respect to the surroundings by the O-ring seal 17.

Figure 3:
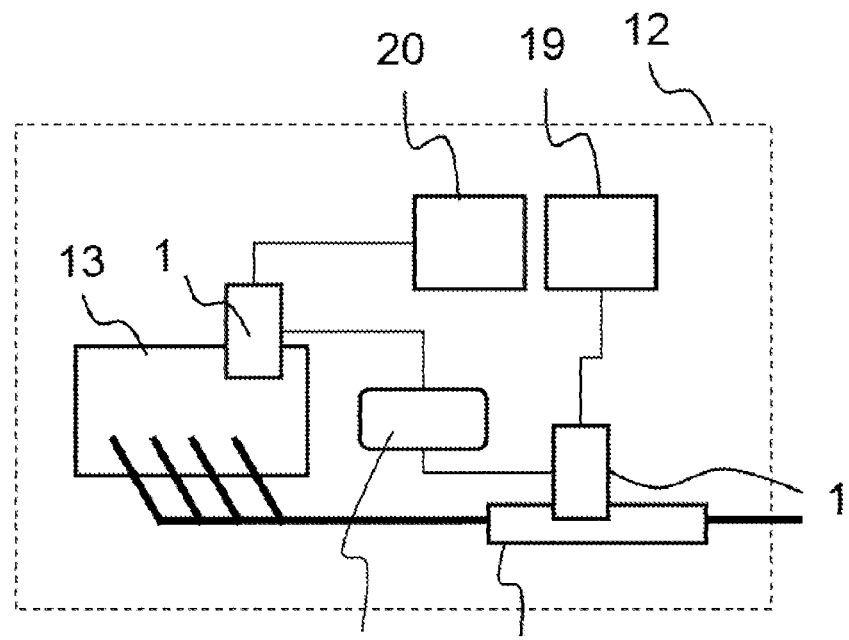
FIG. 3 is a block diagram of a motor vehicle having different injection devices.

FIG. 3 shows a motor vehicle 12 having an internal combustion engine 13 and having an exhaust-gas treatment device 15 for the purification of the exhaust gases of the internal combustion engine 13. Two different injection devices 1 are indicated in FIG. 3. A first injection device 1 is provided on the internal combustion engine 13 and serves, for example, for the supply of fuel into the internal combustion engine 13. For this purpose, the injection device 1 is supplied with fuel from a fuel tank 20. A second injection device 1 is illustrated on the (exhaust line of the) exhaust-gas treatment device 15 and serves for the supply of a reducing agent into the exhaust-gas treatment device 15. A selective catalytic reduction of nitrogen oxide compounds in the exhaust gas of the internal combustion engine 13 can be performed in a non-illustrated SCR catalytic converter by using the reducing agent. The injection device 1 is supplied with reducing agent from a reducing agent tank 19. The operation of the injection devices 1 according to demand is controlled by a controller 21.

Figure 4:
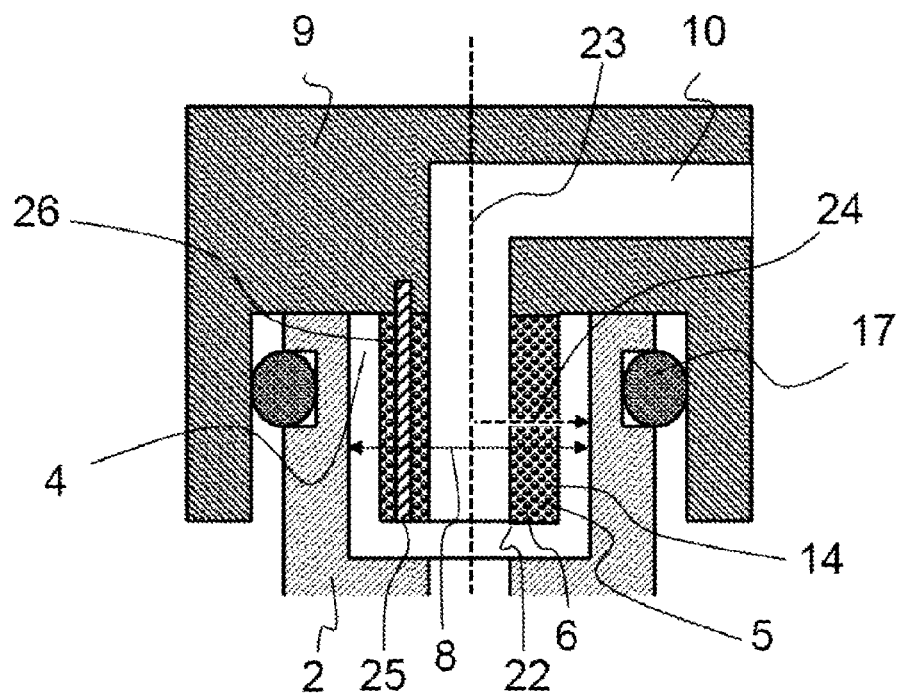
FIG. 4 is an enlarged, sectional view of another embodiment of the portion A of the injection device of FIG. 1.

FIG. 4 illustrates a further embodiment of the injection device in detail. Those details of FIG. 4 which correspond to FIG. 2 will not be explained again herein, with reference rather being made to the description relating to the figure.

In FIG. 4, a component 5 of the injector holder 3 likewise extends into the supply opening 4 of the injector 2. In this case, too, the component 5 is in the form of a pipe 6. The pipe 6, however, does not have a perforation, but instead is composed of a flexible and/or compressible material. The pipe 6 may, for example, be composed of a material with pores 26, in which the pores are closed and filled with a compressible gas (for example air). The fluid preferably cannot penetrate into the pores 26. When the pressure in the injection device rises, the gas in the pores 26 can be compressed. The component 5 can thus be compressed—that is to say reduced in terms of its inherent volume—and the volume reduction can at least partially compensate for an ice-induced expansion. It is additionally or alternatively possible for at least one stiffening structure 25 to also be provided in the component 5 or the pipe 6. The stiffening structure 25 can prevent the component 5 from being compressible in the longitudinal direction 23. The stiffening structure 25 preferably has no (significant) influence on the compressibility of the component 5 in the radial direction 24.

With regard to the description of the figures, it is also pointed out that the functions, modes of operation and technical features presented therein may also be applied to the invention per se and/or to details of other figures. A person skilled in the art, when studying the description, will readily identify that the functions, modes of operation and/or technical details presented herein for one figure may also be individually combined with those of other figures. The only exception to this is if, in this case, such a combination is explicitly ruled out or technically impossible.

The invention claimed is:

1. An injection device for injecting a fluid into an exhaust-gas treatment device, the injection device comprising:
    an injector having a supply opening;
    a longitudinal direction oriented parallel to said supply opening and a radial direction;
    an injector holder in which said injector is positioned, said injector holder having an insert with a component extending into said supply opening through said supply opening;
    said insert forming a feed duct through which the fluid can pass into said supply opening of said injector;
    said component being rigid in said longitudinal direction and at least partially compressible in said radial direction; and
    a rubber sheathing at least partially covering a perforation in said component.

2. The injection device according to claim 1, wherein said component is configured to accelerate a rate of supplying the fluid to said injector.

3. The injection device according to claim 1, wherein said supply opening has a first cross-sectional area, and at least 40% of said first cross-sectional area is filled by said component.

4. The injection device according to claim 1, wherein said rubber sheathing is an ice pressure compensator configured to accommodate an expansion of the fluid in said longitudinal direction.

5. The injection device according to claim 1, which further comprises a spring bracing said injector in said injector holder.

6. A motor vehicle, comprising:
    an internal combustion engine;
    an exhaust-gas treatment device for purification of exhaust gases of said internal combustion engine; and
    an injection device for supplying a fluid to said exhaust-gas treatment device, said injection device including:
        an injector having a supply opening,
        a longitudinal direction oriented parallel to said supply opening and a radial direction,
        an injector holder in which said injector is positioned, said injector holder having an insert with a component extending into said supply opening through said supply opening,
        said insert forming a feed duct through which the fluid can pass into said supply opening of said injector,
        said component being rigid in said longitudinal direction and at least partially compressible in said radial direction; and
        a rubber sheathing at least partially covering a perforation in said component.

* * * * *